United States Patent [19]
Therrien

[11] Patent Number: 5,718,078
[45] Date of Patent: Feb. 17, 1998

[54] FIRE ANT TRAP AND METHOD FOR ENTRAPPING FIRE ANTS

[76] Inventor: Gerard E. Therrien, 70 Burford Ave., West Springfield, Mass. 01089

[21] Appl. No.: 638,596

[22] Filed: Apr. 29, 1996

[51] Int. Cl.⁶ ................................................ A01M 1/02
[52] U.S. Cl. ........................... 43/121; 43/111; 43/107
[58] Field of Search ............................. 43/107, 111, 121, 43/124, 125, 131, 132.1, 138, 139, 140; 74/44, 51

[56] References Cited

U.S. PATENT DOCUMENTS

| | | | |
|---|---|---|---|
| 364,359 | 6/1887 | Madden | 43/111 |
| 981,459 | 1/1911 | Moncus | 43/111 |
| 2,168,339 | 8/1939 | Himel | 43/121 |
| 2,545,772 | 3/1951 | Fisher | 43/121 |
| 2,907,136 | 10/1959 | Banowetz | 43/121 |
| 4,330,992 | 5/1982 | Senft | 74/44 X |
| 4,438,585 | 3/1984 | Slatton | 43/132.1 X |
| 4,640,044 | 2/1987 | Varnon | 43/132.1 |
| 4,667,436 | 5/1987 | Benson | 43/132.1 |
| 4,683,673 | 8/1987 | Taylor | 43/139 |
| 5,241,777 | 9/1993 | Looker et al. | 43/124 |
| 5,325,626 | 7/1994 | Jackson | 43/124 |
| 5,400,543 | 3/1995 | Ideker | 43/139 |
| 5,456,042 | 10/1995 | Mathews | 43/111 |

*Primary Examiner*—Joseph J. Hail, III
*Assistant Examiner*—Anthony Ojini
*Attorney, Agent, or Firm*—Mario D. Theriault

[57] ABSTRACT

A fire ant trap having a stand comprising at least one prong for penetrating the surface of a fire ant mound and for supporting the trap above the mound. The fire ant trap also comprises an actuator assembly mounted atop the stand. The actuator assembly has a stalk member connected to the prong at a first end thereof and extending into a stem-like member at a second end thereof. The actuator assembly also comprises a timer and a stem-striking element for periodically impacting the stem member, and a container having an opening encircling and enclosing a portion of the stem member. In one aspect of the present invention there is provided a novel method for entrapping fire ants in a container, which is essentially a use of the aforesaid fire ant trap. This new method comprises the steps of; inserting a prong in a fire ant mound; vibrating slightly the prong for provoking the ants in that mound and for defensively urging these ants to climb the prong; encircling a portion of the prong in the container; periodically shaking that portion of the prong for dislodging the ants therefrom, and for causing these ants to fall into the container; and closing the container entrapping the ants thereinto.

20 Claims, 4 Drawing Sheets

FIRE ANT TRAP AND METHOD FOR ENTRAPPING FIRE ANTS

FIELD OF THE INVENTION

The present invention relates to a device and a method for attracting and entrapping fire ants. More particularly, the present invention relates to a device and a use of a device having prongs for penetrating the surface of a fire ant mound. A subtle vibration is applied to the prongs for provoking the ants, for urging them to climb the prongs and to creep into a container communicating with the prongs wherein they can be entrapped.

BACKGROUND OF THE INVENTION

Fire ants are common especially in the southern part of the United States. Fire ants live in the ground and build conspicuous mounds which can expand to a height of nearly a foot or more and a diameter of several feet. Such mounds cause extensive damage to lawns, parks, nature trails, pasturage, and landscape architectures.

Fire ants are known to climb in numbers the legs of a person standing nearby one of those mounds, and to attack their victim simultaneously, injecting a venom which causes an intense burning pain. Fire ants are particularly dangerous to children, to adults allergic to the fire ant sting, to livestock and to other small animals.

Several types of devices have been developed in the past to entrap and exterminate fire ants. In a first example, U.S. Pat. No. 2,168,339 issued on Aug. 8, 1939 to Curtis J. Himel, discloses an ant trap comprising a insecticide receptacle, a bait receptacle and a runway to the bait receptacle with a gap over the insecticide receptacle. The insects trying to cross over the gap loose their grip and fall into the liquid insecticide.

A first inconvenient with this device is that the insecticide receptacle has an opened top whereby the chemical insecticide is accessible to birds, rodents and also to young infants left unattended, when the device is installed near a playground for example.

In a more recent example, the U.S. Pat. No. 5,325,626, issued on Jul. 5, 1994 to Robert L. Jackson describes another device for eradicating fire ants using a chemical insecticide. The pesticide dispenser described therein includes a reservoir and a conduit that transports the liquid pesticide from the reservoir to a pointed tip. The tip is adapted to be pushed deep into an ant mound, for delivering the liquid insecticide directly into an entire fire ant colony.

However, recent awareness of the environmental dangers associated with these pesticides have severely limited their uses. In this respect many chemical pesticides are not recommended for use near agricultural fields, fruit bushes and streams where the chemical products may enter a food chain. Hence, the pesticide dispenser described therein is not always practical for controlling an infestation by fire ants in all geographic locations.

Another relevant device is described in the U.S. Pat. No. 4,667,436 issued on May 26, 1987 to James A. Benson. This patent describes an apparatus powered by an electric alternating source, and a spike for insertion in an anthill. The device has an insulator and two wires wrapped about the insulator forming a double helical coil. The two wires have a high voltage applied across them to electrocute fire ants upon contact.

Still a further type of device for exterminating fire ants is described in the U.S. Pat. No. 5,400,543, issued on Mar. 28, 1995 to Dwane R. Ideker, Jr. The apparatus for capturing and exterminating fire ants includes a container, a vacuum unit and an inlet hose having a digging attachment to loosen a fire ant mound. The device is used for collecting the entire mound contents by suction, and for exterminating the ants by asphyxiation inside the container.

Fire ant mounds are not always located near a source of electricity, and it may not always be appropriate to run an electric extension cord to the anthill to operate a vacuum unit or the electrode of the prior art inventions described above. Therefore, electrical devices in general are disadvantaged for controlling an infestation by fire ants on a large property for example, or near a cottage where electricity is not available.

SUMMARY OF THE INVENTION

In the present invention, however, there is provided a fire ant trap having a stand comprising at least one prong for penetrating the surface of a fire ant mound, and for supporting the trap above the mound. The trap also comprises an actuator assembly mounted atop the stand.

This actuator assembly has a stalk member connected to the prong at a first end thereof and extending into a stem-like member at a second end thereof. The actuator assembly also comprises a timer and a striking means for recurrently impacting the stem member.

The fire ant trap of the present invention further comprises a container being supported by the actuator assembly, and having an opening encircling and enclosing a portion of the stem member.

During use of the fire ant trap, a vibration of the actuator assembly is transmitted through the prong for provoking the ants in the mound, and for inciting those ants to climb the prong and to creep onto the stem member. Then, the abrupt shaking of the stem member dislodges the ants therefrom and causes them to fall into the container.

A first advantage of this aspect of the present invention is that the vibration of the actuator assembly transmitted through the prong irritates the ants and avails their natural defensive instinct to attract them into a container where they can be impetuously entrapped.

In accordance to another aspect of the present invention, the timer of the actuator assembly is a mechanical clockwork. Thus the clockwork produces a subtle vibration to continuously provoke the ants in that mound. Moreover, the fire ant trap of the present invention does not require electricity or chemical insecticide, and can operate unattended for relatively long periods.

In accordance to yet another aspect of the present invention, the container used therewith is a common plastic soft-drink container; a 2-liter bottle for example. A first advantage of using such container is that the inside surface of these bottles is highly polished, making it hard for the ants to climb back along its inside walls.

A second advantage for using a soft-drink container is that these bottles are readily available and are easily sealed off with their original caps to asphyxiate the ants trapped therein when an anthill has been cleaned out.

In accordance to a further aspect of the present invention, there is provided a novel method for entrapping fire ants in a container. This new method comprises the steps of;

a) inserting a prong in a fire ant mound;

b) vibrating slightly the prong for provoking the ants in that mound and for defensively urging these ants to climb the prong;

c) encircling a portion of the prong in the container;

d) periodically shaking that portion of the prong for dislodging the ants therefrom, and for causing these ants to fall into the container; and e) closing the container entrapping the ants thereinto.

Fire ants have a natural instinct of attacking an intruder in numbers. Accordingly, this new method uses the natural instinct of the insects to attract them into a container where they can be entrapped. An intermittent or a continuous subtle vibration transmitted into the mound over a long period causes all ants in that mound to climb into the container or to move away.

BRIEF DESCRIPTION OF THE DRAWINGS

The preferred embodiment of the invention will be further understood from the following description, with reference to the drawings in which.

DETAILED DESCRIPTION OF THE PREFERRED EMBODIMENT

Figure 1:
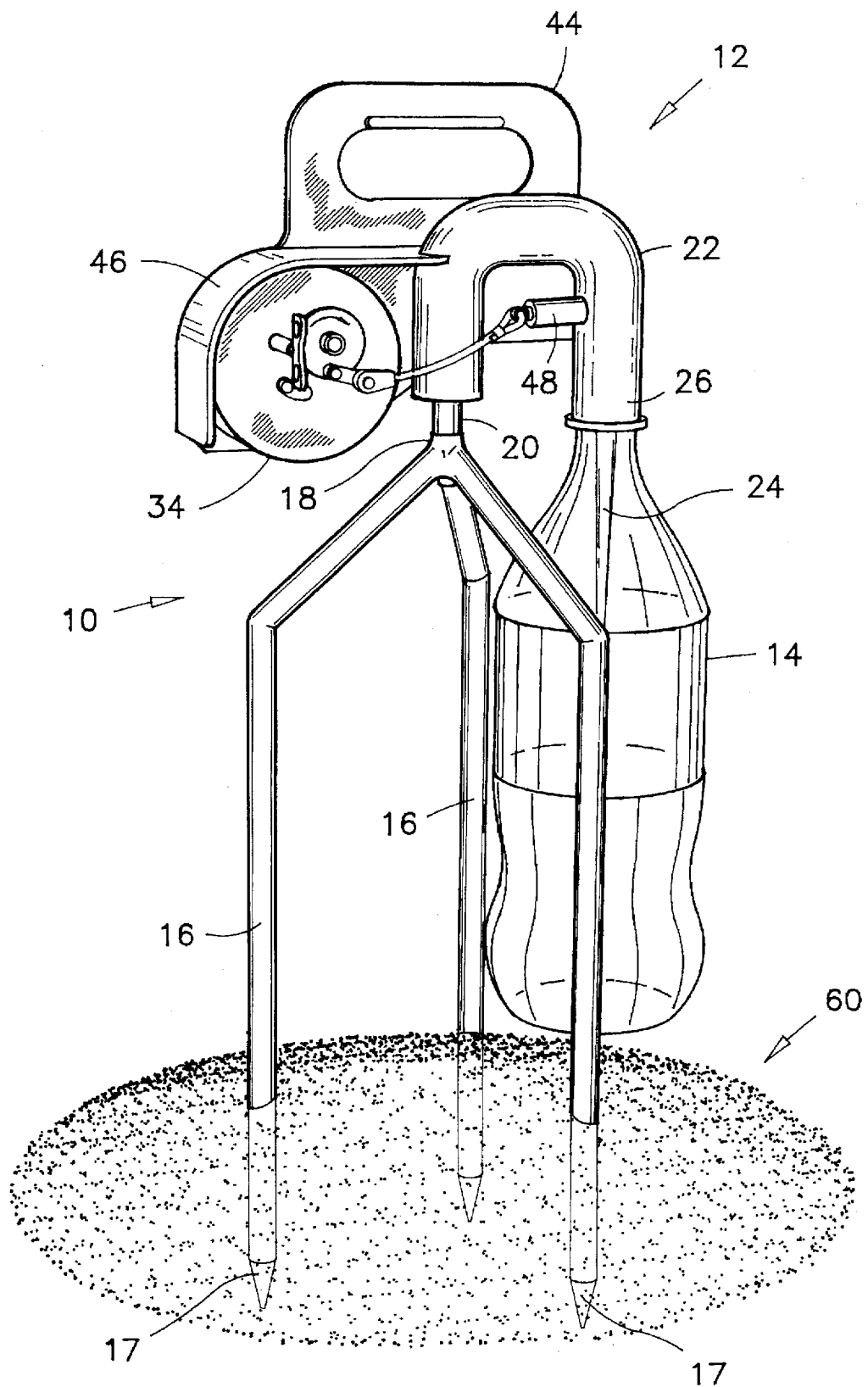
FIG. 1 is a perspective left side, front and top view of the fire ant trap of the preferred embodiment, in an operating position above an anthill.
Figure 2:
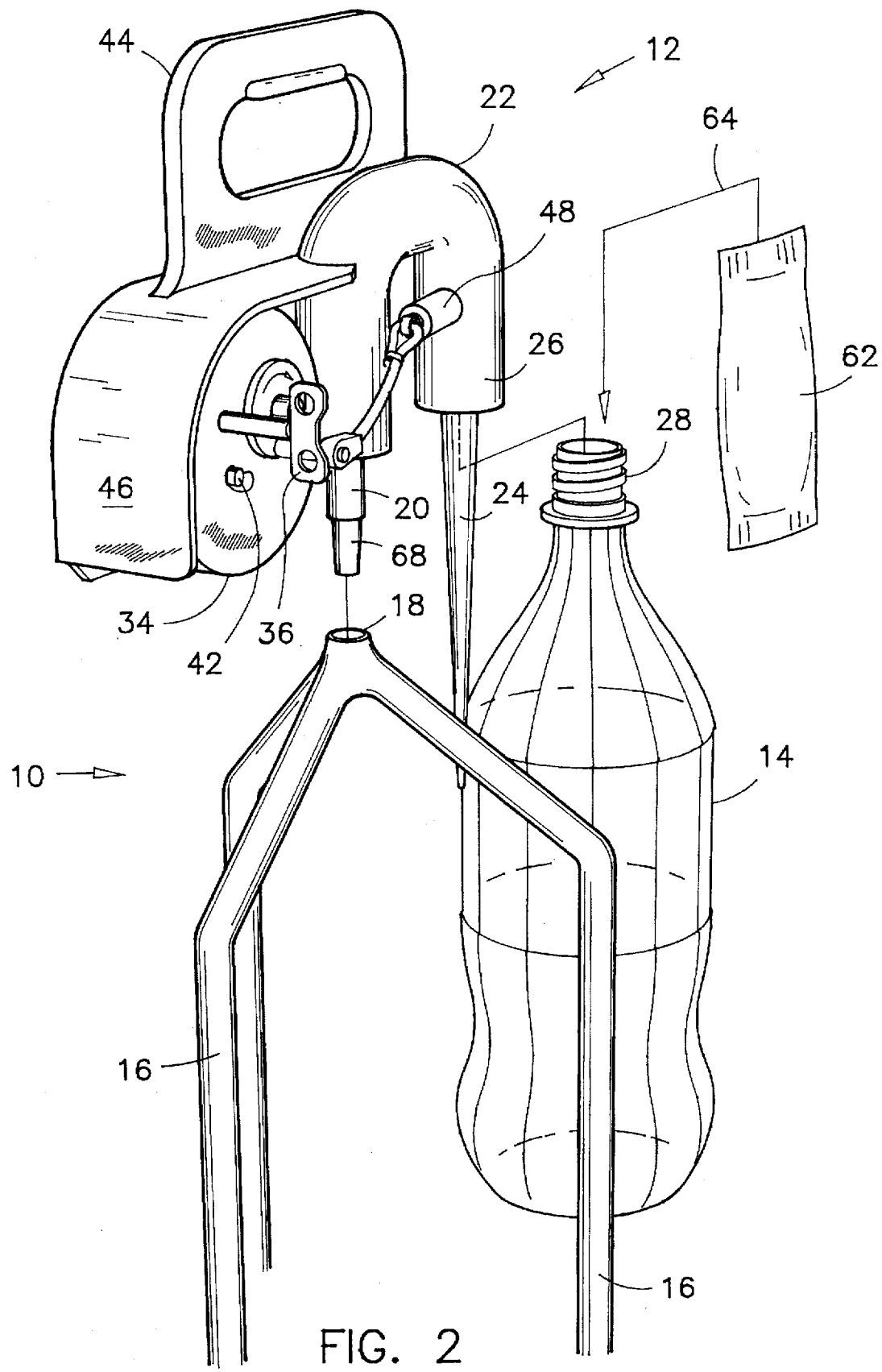
FIG. 2 is a perspective left side, front and top view thereof, illustrated in an exploded mode.
Figure 3:
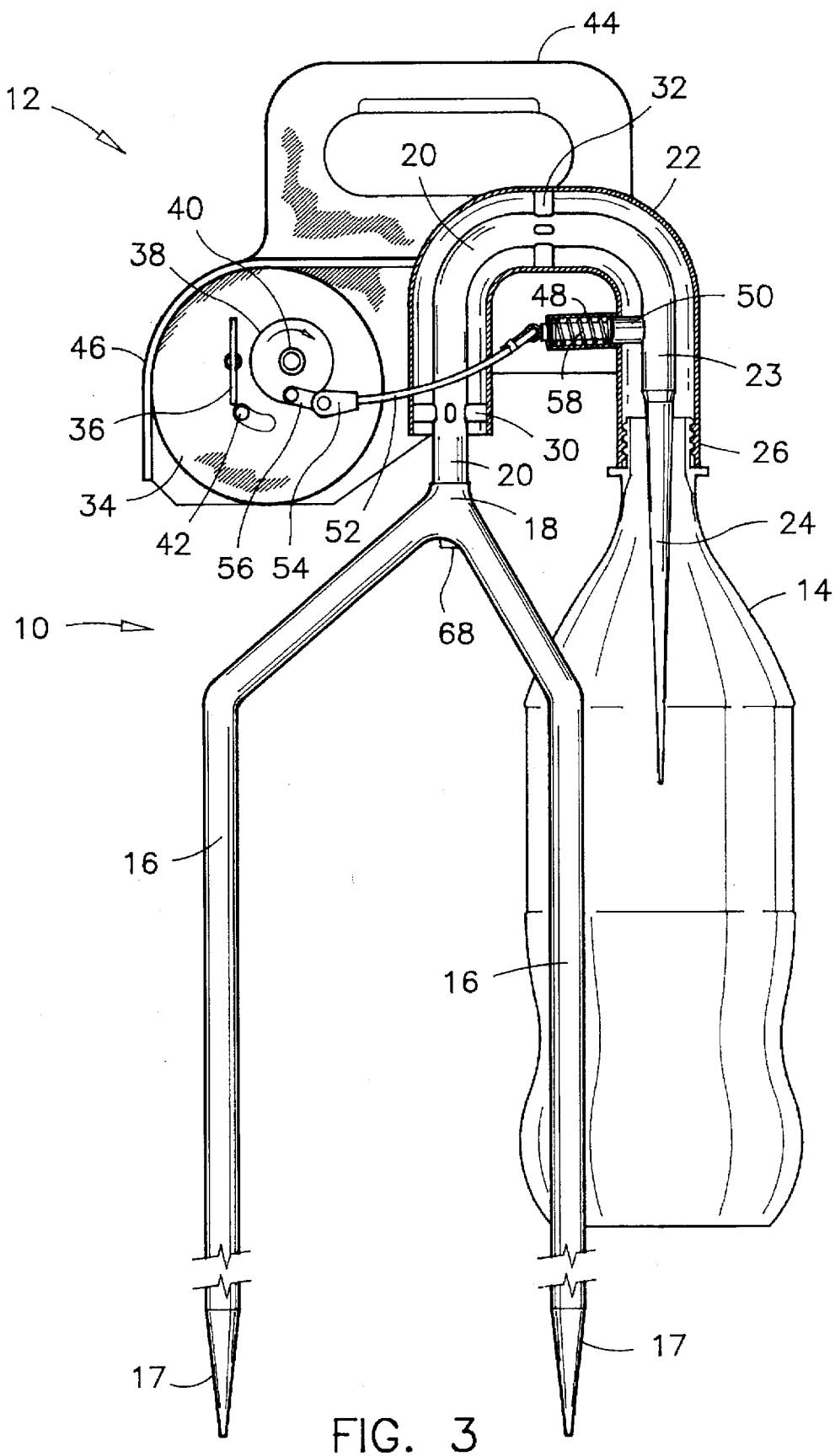
FIG. 3 is a front view of the fire ant trap of the preferred embodiment, illustrating a cross section view the tubular member thereof.

Referring now to FIGS. 1, 2 and 3, there is illustrated a fire ant trap of the preferred embodiment. The fire ant trap of the preferred embodiment comprises broadly a stand 10, an actuator assembly 12 and a container 14.

The stand 10 preferably has the shape of a tripod with three prongs 16 each having an upper end joining one-another in a socket-like formation 18. Each prong preferably also has a lower pointed end 17 which is adapted to penetrate the ground.

The actuator assembly 12 has a stalk member 20 connected to the socket formation 18 and extending inside an inverted U-shaped tubular member 22, following a central axis of the tubular member 22, and into the container 14. The portion of the stalk member 20 extending towards and inside the container is a pointed stem member 24 having a smooth and slippery surface.

The tubular member 22 has an inside diameter substantially larger than the diameter of the stalk member 20 such that fire ants climbing on the stalk member 20 cannot reach the inside surface of the tubular member 22. The stalk member 20 is held inside the tubular member 22 by means of two spider-like spacers 30, 32 as illustrated on FIG. 3.

The tubular member 22 is opened at a first end thereof near the socket formation 18, and has a threaded opening 26 at a second end thereof for retaining the threaded neck 28 of a suitable container 14. The container 14 is preferably a soft-drink bottle type, such that it can be sealed off with a common soft-drink bottle cap and discarded with fire ants therein after use on the fire ant trap of the present invention.

The actuator assembly 12 also comprises a clockwork 34 for operating the stem-striking means, as will be explained later. The clockwork 34 is preferably a mechanical manual-type clockwork having a winding crank 36 and a dial wheel 38. The dial wheel 38 has a cylindrical boss 40 protruding axially from the from face thereof. The clockwork 34 may also have a thumb knob selector 42 for setting the rotational speed of the dial wheel 38 to a first or a second value.

The actuator assembly 12 may also optionally comprise a handle 44 for carrying the fire ant trap from place to place, and a flap 46 extending over the clockwork 34 for protecting it from rain and dew.

The tubular member 22 has, immediately above the threaded opening 26, a hollow protrusion 48 extending radially from the tubular member 22 towards the clockwork 34. A plunger 50 is movably mounted inside the hollow protrusion 48, and is connected to the dial wheel 38 by means of a string 52, a shackle 54 and a link member 56. The plunger is urged towards the base 23 of the pointed stem member 24 by a spring 58.

In use, the tripod stand 10 is set over a fire ant mound 60 as illustrated in FIG. 1, with the prongs 16 penetrating the mound 60 to a depth which is sufficient to rigidly support the fire ant trap of the preferred embodiment, while the container 14 does not touch the mound 60. A suggested depth of the prongs 16 below the surface of the mound 60 is approximately between two to six inches.

The fire ant trap of the preferred embodiment is preferably sold with one or more sealed envelopes 62 containing a composition made of a sticky substance and a fire ant bait, such as molasses and/or gear oil. This composition is preferably poured into the container 14, as indicated by arrow 64 of FIG. 2.

The composition is also preferably spread over a major inside surface of the container 14 by working the container in several directions prior to installing in to the thread engagement 26 at the second end of the tubular member 22.

At that time, the clockwork 34 may be fully wound, and the actuator assembly 12 with the container 14 attached thereto may be mounted on the tripod stand 10 by placing a taper extremity 68 of the stalk member 20 into the socket formation 18. The fire ant trap of the preferred embodiment is thereby ready for use for attracting and capturing fire ants in that anthill 60.

The operation of the clockwork 34 produces a light vibration which is transmitted through the prongs 16 and into the mound 60. Such a vibration, and the intermittent operation of the stem-striking means provokes the fire ants, urges them to climb the prongs 16 and to creep into the tubular member 22. Once the ants are inside the tubular member 22, the odour of the bait inside the container 14 incites them to move further and to accumulate over the pointed stem member 24.

The rotation of the dial wheel 38 of the clockwork 34, in cooperation with the link member 56, the shackle 54 and string 52 causes the plunger 50 to periodically strike against the base 23 of the pointed stem member 24, to dislodge the fire ants from the stem member 24, and to cause these ants to fall and stick to the bottom of the container 14.

The operation described above is further enhanced when the prongs 16 and stalk member 20 have a dull-finished surface to provide a good adherence to the ants, and when the pointed stem member 24 has a highly polished and slippery surface. A smooth coating may also be applied over the stem member 24 to further increase its slipperiness, to dislodge therefrom a large number of ants at every blow of the plunger 50.

The inside surface of a soft drink container 14, as suggested herein, is also relatively smooth whereby the ants escaping the sticky composition, and attempting an ascension against the inside wall of the container 14 are also dislodged at every blow of the plunger 50. The tubular member 22 retaining the container 14 receives a reactive impact from the plunger 50 striking against the base 23 of the pointed stem member 24. Hence, both the container 14 and the pointed stem member 24 are shook periodically to dislodged the ants accumulating on the surfaces thereof.

When a quantity of ants are captured inside the container 14, and when there is no apparent activity in the mound 60 or near the prongs 16, the container 14 may be taken off the actuator assembly 12, and sealed off with the original container cap to asphyxiate the entrapped ants. The container 14 may then be discarded or washed out for reuse on another anthill.

Referring now to FIGS. 4, 5, 6 and 7, there is illustrated the operation of the plunger 50. As said earlier, the movement of the plunger 50 inside the protrusion 48 is effected by means of a string 52, a shackle 54 and a link member 56 connected to the dial wheel 38, and of a spring 58 inside the protrusion 48. The spring 58 urges the plunger 50 against the base 23 of the pointed stem member 24.

Figure 4:
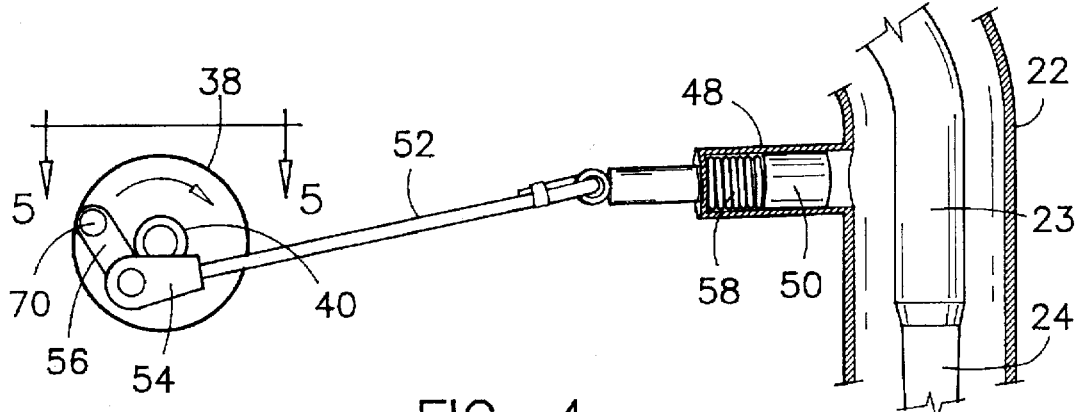
FIG. 4 is a partial cross section view of the tubular member thereof, and of the clockwork dial wheel in a first position.
Figure 5:
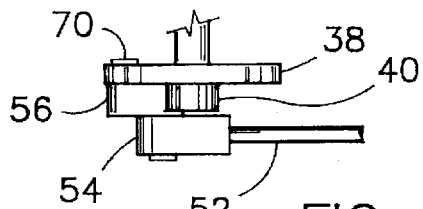
FIG. 5 is a top view of the clockwork dial wheel as viewed along line 5—5 of FIG. 4.

When the clockwork dial wheel 38 rotates in a clockwise direction, and when the connection 70 of the link member 56 to the dial wheel 38 is in a left side quadrant of the dial wheel 38, as illustrated on FIGS. 4 and 5, the link member 56 interferes with the boss 40, and is levered by boss 40 such that the shackle 54 follows an arc about the axis of the dial wheel 38. This movement of shackle 54 pulls on the string 52 and on the plunger 50 to compress the spring 58.

Figure 6:
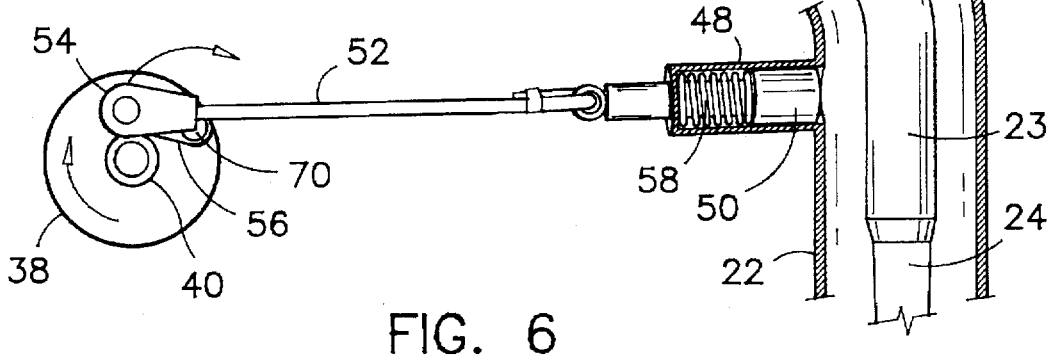
FIG. 6 is also a partial cross section view of the tubular member thereof, and of the clockwork dial wheel in a second position.
Figure 7:
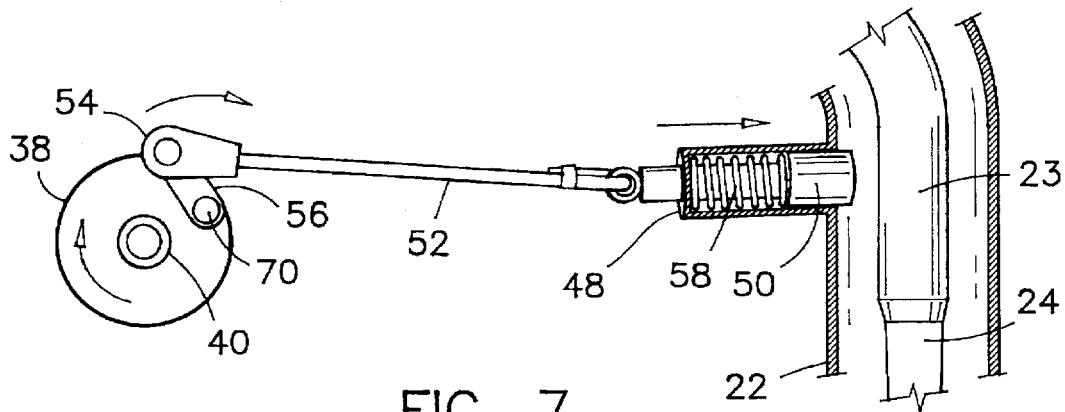
FIG. 7 is yet another partial cross section view of the tubular member thereof, and of the clockwork dial wheel in the second position when a motion is set for the plunger to strike the base of the pointed stem member.

As the dial wheel 38 continues to rotate under the action of the clockwork 34, the connection 70 of the link member 56 moves in a right hand quadrant of the dial wheel 38, as illustrated on FIGS. 6 and 7. When the connection 70 gets passed a longitudinal axis of the string 52, as seen on FIG. 6, the link member 56 becomes in an unstable position. The force of the spring 58 causes the link member 56 to rotate about the connection 70 as illustrated on FIG. 7, and to let the plunger 50 move precipitately, to strike against the base 23 of the pointed stem member 24.

The stalk member 20 and the pointed stem member 24 are held into the tubular member 22 by a first and second spider spacer 30,32 as explained earlier. The pointed stem member 24 is therefore unsupported in a region on interference with the axis of the plunger 50. The pointed stem member 24 is thereby able to resonate vigorously under a striking of the plunger 50, to dislodge the ants which may have accumulated on its surface. This movement is repeated according to the period of the dial wheel 38.

A clockwork 34 for use in the fire ant trap of the preferred embodiment has a winding duration of at least about ten to twelve hours, and preferably up to twenty four hours or more. A rotation of the dial wheel 38 is preferably one turn at every thirty seconds to a period of thirty minutes or more. The clockwork 34 may also have a dual speed selector 42, as mentioned earlier to accommodate anthills of different populations.

It would become apparent to the person knowledgeable in the art, that a longer winding duration, or a different stem-striking means may be employed without departing from the broad concept of the present invention. It would also become apparent to the person skilled in the art that the prongs may be replaced by alternate means for supporting the fire ant trap, and for transmitting a vibration into an ant mound, without affecting greatly the results disclosed herein.

Accordingly, while the above description provides a full and complete disclosure of the preferred embodiment of this invention, various modifications, alternate constructions and equivalents may be employed without departing from the true spirit and scope of the invention. Such changes might involve alternate materials, components, structural arrangements, sizes, operational features or the like. Therefore, the above description and accompanying illustrations should not be construed as limiting the scope of the invention which is defined by the appended claims.

I claim:

1. An ant trap comprising:
    a stand having at least one prong member for penetrating an ant mound;
    an actuator assembly mounted atop said stand, said actuator assembly comprising; an inverted U-shaped member having first and second ends; a rod-like member, and a rod-striking means comprising a timer; said first end of said inverted U-shaped member being connected to said prong member, said rod-like member being suspended to said second end of said inverted U-shaped member, said rod-striking means being affixed to said U-shaped member and being operable and stoppable by said timer for intermittently impacting said rod-like member;
    a container being supported by said actuator assembly, said container having an opening encircling and enclosing a portion of said rod-like member;
    wherein during use thereof, a vibration of said timer is transmitted to said mound through said prong member, for provoking the ants in said mound and for inciting said ants to climb said prong member, to creep along said inverted U-shaped member and onto said rod-like member;
    wherein an impacting of said rod-like member by said rod-striking means dislodges said ants from said rod-like member and causes said ants to fall into said container.

2. An ant trap as claimed in claim 1, wherein said timer is a clockwork, whereby a subtle vibration thereof continuously provokes said ants in said mound.

3. An ant trap as claimed in claim 2, wherein said clockwork has a winding duration of at least 24 hours.

4. An ant trap as claimed in claim 1, wherein said stand is a tripod stand, and said prongs are pointed at their lower ends.

5. An ant trap as claimed in claim 1, wherein said actuator assembly is removably mounted atop said stand by means of a portion of said inverted U-shaped member mating into a socket formation on said stand.

6. An ant trap as claimed in claim 1, wherein said inverted U-shaped member is enclosed in a tubular member having a threaded connection oriented downwardly, for removably supporting said container therewith.

7. An ant trap as claimed in claim 6, wherein said container is a plastic soft-drink bottle having a thread around said opening.

8. An ant trap as claimed in claim 7, wherein said rod-striking means comprises a plunger and a spring mounted in a hollow protrusion of said tubular member, whereby an operation of said rod-striking means acts simultaneously on said rod-like member and on said container for dislodging ants climbing an inside wall of said container.

9. An ant trap as claimed in claim 8, wherein a portion of said inside wall of said container is covered with a sticky composition comprising an ant bait.

10. An ant trap as claimed in claim 9, wherein said prong member has a dull-finished surface, and said rod-like member is a pointed member having a slippery surface.

11. An ant trap as claimed in claim 6, wherein said timer has a rotatable output shaft, and said rod-striking means further comprises;

a plunger and a spring movably mounted inside a hollow protrusion of said tubular member;

a dial wheel rigidly mounted on said output shaft, said dial wheel having a face portion being substantially parallel with a longitudinal axis of a movement of said plunger inside said protrusion, said face portion having a boss projecting along a central axis thereof;

a link member pivotally mounted on said face portion of said dial wheel adjacent said boss;

a shackle pivotally attached to said link member; and a string between said shackle and said plunger;

whereby upon a rotation of said output shaft and said dial wheel said link member is levered by said boss thereby pulling on said string during a first portion of a revolution of said dial wheel, and said link member swiftly pivots away from said boss thereby releasing said string during a second portion of said revolution of said dial wheel.

12. An ant trap as claimed in claim 1, wherein said timer has a period of between about 30 seconds to about 30 minutes.

13. An ant trap as claimed in claim 12, wherein said timer has a period selector knob for selecting between a first period setting and a second period setting thereof.

14. An ant trap as claimed in claim 1, wherein said actuator assembly comprises a handle for lifting said actuator assembly with ease.

15. A fire ant trap comprising:

a tripod stand having three prongs for penetrating a fire ant mound;

an actuator assembly mounted atop said stand, said actuator assembly comprising; an inverted U-shaped member having first and second ends; a rod-like member, a rod-striking means comprising a timer, and a tubular member enclosing and being affixed to said inverted U-shaped member; said first end of said inverted U-shaped member being connected to said prong member, said rod-like member being suspended to said second end of said inverted U-shaped member, said rod-striking means being affixed to said tubular member and being operable and stoppable by said timer for intermittently impacting said rod-like member; said tubular member having a threaded connection encircling said rod-like member;

a container having an opening connected to said threaded connection of said tubular member, said container enclosing said rod-like member completely;

wherein during use thereof, a vibration of said timer is transmitted through said prongs and into said mound, for provoking the ants in said mound, and for inciting said ants to climb said prongs, said inverted U-shaped member and for accumulating on said rod-like member;

wherein an actuation of said rod-striking means against said rod-like member dislodges said ants therefrom and causes said ants to fall into said container.

16. A fire ant trap as claimed in claim 15, wherein said timer is a clockwork, whereby a subtle vibration thereof continuously provokes the ants in said mound.

17. A fire ant trap as claimed in claim 15, wherein said threaded connection is oriented downwardly and said container is a plastic soft-drink bottle having a thread around said opening.

18. A method for entrapping fire ants in a container, comprising the steps of;

inserting a prong in a fire ant mound;

vibrating slightly said prong for provoking the ants in said mound and for defensively urging said ants to climb said prong;

enclosing a portion of said prong in said container; periodically striking said portion of said prong for dislodging said ants therefrom, and for causing said ants to fall inside said container; and closing said container entrapping said ants thereinto.

19. A method for entrapping fire ants as claimed in claim 18, comprising the additional step of applying a slippery coating over a surface of said portion of said prong.

20. A method for entrapping fire ants as claimed in claim 19, comprising the further step of attracting said ants to said portion of said prong by placing ant bait into said container.

* * * * *